United States Patent [19]
Cleckner et al.

[11] Patent Number: 5,827,627
[45] Date of Patent: *Oct. 27, 1998

[54] RECEIVING ELEMENT FOR LIQUID TONER-DERIVED INK

[75] Inventors: Michael Dale Cleckner, Honeoye; George Forman Cretekos, Macedon; Pang-Chia Lu, Pittsford; Robert Edward Touhsaent, Fairport, all of N.Y.

[73] Assignee: Mobil Oil Corporation, Fairfax, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 598,592

[22] Filed: Feb. 12, 1996

Related U.S. Application Data

[63] Continuation-in-part of Ser. No. 582,819, Jan. 4, 1996, which is a continuation-in-part of Ser. No. 383,133, Feb. 3, 1995.

[51] Int. Cl.$^6$ .............................. G03C 3/00; B32B 27/00
[52] U.S. Cl. .............................. 430/18; 430/49; 430/117; 428/326; 428/327; 428/331; 428/500; 428/516; 428/520
[58] Field of Search .............................. 430/18, 49, 117; 428/500, 326, 327, 331, 516, 520

[56] References Cited

U.S. PATENT DOCUMENTS

| | | | |
|---|---|---|---|
| 4,486,483 | 12/1984 | Caines | 428/195 |
| 4,621,271 | 11/1986 | Brownstein | 346/76 PH |
| 4,968,063 | 11/1990 | McConville et al. | 283/72 |
| 4,981,758 | 1/1991 | Chu et al. | 428/516 |
| 5,055,371 | 10/1991 | Lee et al. | 430/126 |
| 5,166,242 | 11/1992 | Chu et al. | 524/238 |
| 5,225,306 | 7/1993 | Almog et al. | 430/115 |
| 5,244,861 | 9/1993 | Campbell et al. | 503/227 |
| 5,276,492 | 1/1994 | Landa et al. | 355/277 |
| 5,346,796 | 9/1994 | Almog | 430/115 |
| 5,350,733 | 9/1994 | Campbell et al. | 503/227 |
| 5,387,574 | 2/1995 | Campbell et al. | 503/227 |
| 5,399,218 | 3/1995 | Harrison et al. | 156/229 |
| 5,407,771 | 4/1995 | Landa et al. | 430/109 |
| 5,419,960 | 5/1995 | Touhsaent | 428/331 |

FOREIGN PATENT DOCUMENTS 0 317 166   5/1989   European Pat. Off. .

*Primary Examiner*—Mark Chapman
*Attorney, Agent, or Firm*—Jessica M. Sinnott; Dennis P. Santini

[57] ABSTRACT

A liquid toner printable thermoplastic film is provided. The film is coated with an ethylene-acrylic acid copolymer based coating capable of electrostatic imaging with liquid toner. Optionally, the coating contains acrylic polymer. In a specific embodiment, the coating includes a major proportion of ethylene-acrylic acid and minor amounts of filler such as talc and silica. The coating can also include wax and/or pigment such as titanium dioxide. In a further embodiment, the carboxylate groups of the copolymer are neutralized with metal ions from Group Ia, IIa or IIb of the Period Table of the Elements, specifically, sodium.

13 Claims, No Drawings

RECEIVING ELEMENT FOR LIQUID TONER-DERIVED INK

CROSS REFERENCE TO RELATED PATENT APPLICATIONS

This application is a continuation-in-part to U.S. application Ser. No. 08/582,819, pending, filed on Jan. 4, 1996, which is a continuation-in-part of U.S. application Ser. No. 08/383,133, pending, filed on Feb. 3, 1995.

FIELD OF THE INVENTION

This invention relates to coated thermoplastic films which are capable of receiving ink derived from liquid toner, especially liquid toner employed in electrostatic printing.

BACKGROUND OF THE INVENTION

Electrostatic printing is a very effective method of image transfer commonly used in photocopying and photoprinting. Typically, in electrostatic printing, a potential electrostatic image is formed on an imaging surface carrying a uniform electrostatic charge. The uniform electrostatic charge can be created by exposing the surface to corona discharge. The uniform electrostatic charge is then selectively discharged by exposing it to a modulated beam of light which corresponds to an image formed from an original. The discharged surfaces form the background while the charged surfaces form the print image. The print image is developed by applying pigmented toner particles which adhere to the undischarged "print" portions of the surface. The pigment is subsequently transferred by various techniques to a copy sheet.

Dry toner is most commonly used in electrostatic printing. The quality and clarity of the image and image resolution, is related to the size of the toner particles. While it is thought that very fine particles will produce a finer image, there is a practical limitation on the size of toner particles that can be used. Dry toner particles must be of sufficient weight and size to be deposited onto the print surface without becoming airborne, which is thought to lead to machinery fouling and, possibly, environmental problems. Additionally, in fixing the image, the dry toner particles are fused onto the paper by exposure to very high temperatures, e.g. in excess of about 400° F. (204° C.). This energy requirement is a significant drawback.

To overcome these disadvantages, liquid toners have been developed in which the toner is dispersed in a solvent. The solvent is removed in the last printing step by the mechanism of the press. Because of the liquid medium, very fine dye particles can be employed without concern for the particles becoming airborne. Thus, copies of very high resolution can be made and high temperatures needed to fuse dry toners are not required. Liquid toners for electrostatic imaging are described in U.S. Pat. Nos. 5,225,306; 5,276,492: 5,346,796 and 5,407,771.

Paper is widely used as the image receiving element in electrostatic imaging. It would be advantageous to use plastic as the receiving element. Among other advantages over paper, plastic is moisture resistant, flexible and heat sealable and plastic substrates can be either clear or opaque. However, the high temperatures necessary for imaging with the dry toners will melt plastic films and the liquid toners do not transfer well or adhere to uncoated plastic.

A polyamide solution sold under the name TOPAZ by Indigo Company is useful as a coating for plastic films and provides a surface that will receive liquid toners. However, polyamides are disadvantages because the solvent poses disposal problems. Additionally, the solution is sensitive to ambient conditions. The solution is difficult to handle at low temperatures (it tends to lose solubility) and the coating absorbs atmospheric moisture which may make the film tacky even after drying. Among others, this can pose blocking problems. Thus, there is a need for a coating for a thermoplastic liquid toner receiving element which overcomes these difficulties.

Coatings containing ethylene-acrylic acid copolymers for polypropylene films have been described for purposes of rendering the film sealable at low temperatures. In U.S. Pat. No. 5, 419,960 a coating composition for a polypropylene film which comprises a copolymer of ethylene and acrylic acid in which about 2 to 80% of the carboxyl groups are neutralized with metal ions from Groups Ia, IIa or IIb of the Periodic Table is described. The coating composition can also contain a slip agent and wax. The coated film provides for good hot tack and blocking properties accompanied by satisfactory low temperature sealing. The seal is also water resistant.

SUMMARY OF THE INVENTION

The invention provides a coating comprising a copolymer derived from a carboxylic acid containing vinylic unsaturation for a thermoplastic film which permits the film to be used as a liquid toner receiving element.

It is an object of this invention to permit electrostatic imaging of thermoplastic films with liquid toner.

It is a feature of this invention to provide an acrylic acid copolymer based coating which permits liquid toner imaging of thermoplastic films.

It is an advantage of this invention that when a thermoplastic film is coated with an acrylic acid copolymer coating, liquid toner can be used in electrostatic imaging of the film without the problems of solvent based coatings, particularly, sensitivity to ambient conditions and solvent disposal difficulty.

The term "liquid toner" covers a composition in which toner particles are dispersed in a liquid base. Typically the liquid base is non-polar such as an aliphatic hydrocarbon fraction. Typical toners of this kind, and processes for using them in imaging, are described in U.S. Pat. Nos. 5,225,306; 5,276,492; 5,346,796 and 5,407,771. The coated films of this invention, surprisingly, are capable of receiving toner derived from these liquid toner compositions.

Thus, the invention is more particularly directed to a liquid toner receiving element for electrostatic imaging comprising a thermoplastic substrate having on at least one side a liquid toner receiving coating comprising a copolymer derived from a carboxylic acid containing vinylic unsaturation.

In another aspect, the invention is directed to a film having applied thereto a liquid toner by electrostatic imaging.

In a still further aspect, the invention is directed to a method of making a liquid toner receiving element comprising the step of applying to at least one surface of a thermoplastic substrate a liquid toner receiving coating, the coating comprising a copolymer derived from a carboxylic acid containing vinylic unsaturation.

DETAILED DESCRIPTION OF THE INVENTION

The carboxylic acid copolymer component of the coating, typically, comprises a copolymer of acrylic acid or methacrylic acid or ester of those acids. The acrylates contemplated contain lower alkyl groups such as those ranging from about 1 to about 16 carbon atoms, specific examples include methyl, ethyl, butyl, lauryl and stearyl. The acrylic copolymer includes a functional comonomer, typically having an average molecular weight of at least about 10,000. The acrylic copolymer usually includes about 5 weight percent of this comonomer.

A particularly useful thermoplastic copolymer is ethylene-acrylic acid copolymer. The ethylene copolymer may be a copolymer of about 65 to 95 wt. %, typically about 75 to about 85 wt. % of ethylene and, for example, about 5 to 35 wt. %, typically about 15 to about 25 wt. % of acrylic acid or methacrylic acid. The copolymer may have a number average molecular weight of about 2,000 to 50,000, preferably about 4,000 to 10,000.

The copolymer is often supplied as a solution or fine dispersion of an ammonium salt of the copolymer in an ammoniacal water solution. When the copolymer is dried, ammonia is given off and the ionized and water sensitive carboxylate groups are converted to largely unionized and less water sensitive free carboxyl groups.

A suitable ethylene-acrylic acid copolymer is available commercially under the tradename Michem, particularly Michem-4983, by Michelman Corporation. Ethylene-acrylic acid is, typically, produced by high pressure copolymerization of ethylene and acrylic acid. When ethylene is copolymerized with acrylic acid, the molecular structure is significantly altered by the random inclusion of bulky carboxylic acid groups along the backbone and side chains of the copolymer. The carboxyl groups are free to form bonds and interact with any poly substrate. Another commercially available ethylene-acrylic acid copolymers is Primacor 4983 sold by Dow Chemical Co. an aqueous dispersion having 25% solids content and obtained from a reaction between 15 mole % acrylic and 85 mol % ethylene.

The total amount of the copolymer present in the entire coating composition can range from about 15% to about 100%, specifically about 30% to about 95% by weight based on the entire weight of the coating composition.

The coating can also include a mixture of copolymer and a polymer of a carboxylic acid containing vinylic unsaturation and an acrylic polymer. A specific concentration of polymer to copolymer is about 5 to 50% polymer and about 95 to about 50% copolymer based on the weight of the copolymer.

In one embodiment, the coating can contain a neutralizing metal ion, for example, an alkali metal. In practicing this aspect of the invention there is added to the solution or dispersion of the copolymer an amount of ions of at least one metal from Group Ia, IIa or IIb of the Periodic Table, preferably, sodium, potassium, lithium, calcium or zinc ions, and most preferably sodium ions, e.g., in the form of their hydroxides. The quantity of such metallic ions may be in the range sufficient to neutralize, for example, about 2 to 80%, preferably about 10 to 50% of the total carboxylate groups in the copolymer. As an example, sodium ions are added as sodium hydroxide. The amount of sodium hydroxide added corresponds to the foregoing percentages of carboxylate groups which are to be neutralized, for example, about 0.33 to 8.8 phr, preferably about 1.1 to 5.5 phr, where "phr" stands for parts by weight per hundred parts of the total resin, which is the same as ethylene copolymer when no other resin is present. For the purpose of determining the phr of various additives present in the coating, all the carboxylate groups of the ethylene copolymer are assumed to be in their free carboxyl (—COOH) form.

In addition to the partially neutralized ethylene copolymer, the coatings of this invention preferably contain an antiblock/slip agent. Typically, this is a relatively large particle size wax. Wax is known to be a low melting organic compound of relatively high molecular weight that is generally a solid at room temperature. The wax provides further lubricity properties. Contemplated waxes are natural wax such as animal wax including beeswax, lanolin and shellac wax, vegetable wax such as carnauba wax, candelilla, bayberry and sugar cane wax, mineral waxes such as fossil or earth wax including oxocerite, ceresin and montan wax. Synthetic waxes are also contemplated such as ethylenic polymers and polyol ether-esters, chlorinated naphthalenes and hydrocarbon waxes such as those derived from the Fischer-Tropsch synthesis. Both natural and synthetic microcrystalline wax are also contemplated. A particularly preferred wax is carnauba wax. The wax may be present in the coating in an amount of, for example, about 1 to about 20%, specifically about 2 to about 10% based on the entire weight of the coating.

In addition to functioning as an anti-blocking material, the wax when incorporated into the coatings of the present invention also functions to improve the "slip" properties of the films coated therewith, i.e., the ability of a film to satisfactorily slide across surfaces at about room temperatures.

Usually, the coatings of this invention contain a relatively inert particulate filler additive. A filler which has found specific utility in the coating of this invention is fumed silica. The fumed silica is composed of particles which are agglomerations of smaller particles and which have an average particle size of, for example, about 2 to 9 microns, preferably about 3 to 5 microns Generally any finely divided inorganic solid materials such as silica is contemplated as a useful filler for purposes of the present coating. These include talc, calcium carbonate, diatomaceous earth, calcium silicate, bentonite and clay. The total amount of filler typically ranges from about 0.1% to about 80%, specifically from about 0.3% to about 7.0% based on the entire weight of the coating. When a clear film is needed the coating will not hinder clarity, in which case the particulate concentration will be relatively low, for example from about 0.1% to about 10%, specifically from about 0.3% to about 7.0%. The particulates are generally small in size, typically ranging from about 1 $\mu$m to about 10 $\mu$m, specifically from about 3 $\mu$m to about 7 $\mu$m. Further examples of fillers include kaolin, silica, aluminum silicates, clay and talc. Pulp is also contemplated.

Preferred among the foregoing fillers are those that function as antiblock/slip agents. Silica is a specific example of a filler which is found to function as in this manner.

Opacity enhancing particulates may also be employed. These are relatively inert substances. Calcium carbonate is extensively used in thermoplastics, it is relatively inexpensive and easy to use. It can be used in its natural form but "precipitated calcium carbonate" which is prepared by chemical processes can be employed. Sometimes, particles of calcium carbonate are coated with a resin to reduce plasticizer absorption and this form can also be employed.

The filler can also include pigment-imparting particulates. Pigments contemplated are organic or inorganic substances with particle sizes which are rarely less than 1 micron in diameter. Typical pigments include carbon black and titanium dioxide. Calcium carbonate can also act as a pigment. Other pigments not to be excluded by this invention are metallic pigments such as particles of aluminum, copper, gold, bronze or zinc. These pigments are usually flake shaped particles which reflect light when incorporated into the coating vehicle.

The fillers, including inert particulate slip/antiblock agents, opacifying agents and/or pigments can be used in combination, depending upon the desired degree of translucency or opacity. Typically when the opacifying particulates and/or pigments are used the concentration is less than about 70% of the total particulate concentration of the coating, specifically about 20% to about 50% of the total particulate concentration of the coating.

Further specific examples of particulates which may be employed in addition to those noted above include acetylene black, alpha cellulose, aluminum silicates, barium sulfate, calcium silicate, calcium sulphate, cellulose, clays, diatomite, glass flake, keratin, lignin, lithophone, mica, microballoons, molybdenum disulfide, nepheline syenite, paper, pulp, quartz, shell flour, talc, vermiculite and wood.

Other optional additives which can be used, include cross-linking agents such as melamine formaldehyde resins which may be present in an amount, for example, of less than about 25 wt. %, anti-static agents such as poly (oxyethylene) sorbitan monooleate which may be present in an amount, for example, of less than about 10 wt. % and antifoam agents such as silicone oil or fluorocarbon which may be present in an amount of less than about 0.1 wt. %, based on the entire weight of the coating.

The coating is made by combining all the ingredients sequentially or at the same time and mixing or blending them at room temperature and atmospheric pressure conditions in a conventional mixing apparatus. Typically, the coating is in an aqueous media having a solids content of about 1 to about 60%, specifically about 5 to about 50% based on the entire weight of the final coating composition.

A particular type of thermoplastic film which can be advantageously coated with the coating compositions of this invention is molecularly oriented, isotactic polypropylene.

After extrusion of the base polypropylene film utilizing conventional extrusion techniques, the film is heated and molecularly oriented by stretching it both in the longitudinal and transverse directions. The resulting oriented film exhibits greatly improved tensile and stiffness properties.

Typically the polyolefin resin, such as polypropylene, is extruded through a flat sheet extruder die at a temperature ranging from between about 200 to about 250° C., casting the film onto a cooling drum and quenching the film. The sheet is then stretched about 3 to about 7 times in the machine direction (MD) orienter followed by stretching about 5 to about 10 times in the transverse direction (TD) orienter.

The film to be treated with the coating of this invention can include any single or multi-layer thermoplastic material that can be formed into a thin film. The film can be clear or opaque. Contemplated thermoplastic materials include any polyolefin such as polypropylene, polyethylene, polybutene, polystyrene, polyvinyl chloride, copolymers and blends thereof. Other film materials contemplated include polyethyleneterephthalate and nylon. In multilayer films there are one or more skin layers located on at least one surface of a thermoplastic core layer. The skin layer can comprise polyethylene, including medium and high density polyethylene, polypropylene, copolymer or terpolymer of $C_2$–$C_5$ alpha olefins or blends thereof. At least one side of the film can comprise a heat seal or pressure seal surface. Typical heat seal materials comprise ethylene and propylene homopolymers, copolymers or terpolymers such as ethylene-propylene, ethylene-propylene-butene-1, and polyvinylidenechloride polymers. Any of the materials can contain processing aids or inorganic particulates such as titanium dioxide or void initiating agent to enhance the whiteness or color of the substrate or to enhance antiblocking properties.

The substrate can comprise at least 3-layers such as a film which comprises a core layer and two outer layers, the core layer comprising polypropylene and at least one of the outer layers selected from the group consisting of a copolymer or terpolymer of propylene and ethylene and/or butene-1 or ethylene homopolymer.

In another embodiment of the invention, the substrate can comprise at least 5-layers such as a film which comprises a core layer, two intermediate layers contiguous to the central core layer and two outer layers, the polymer of at least one of the intermediate layers comprises polypropylene and the polymer of at least one of the two outer layers comprises a copolymer or terpolymer of propylene and ethylene and/or butene-1 or ethylene homopolymer.

The coating composition of this invention may be applied to both surfaces of the film but this might pose blocking problems. Alternatively, one surface may have another coating composition applied to it on a side opposite to the toner receiving surface. This other side of the film can be coated with a heat seal or a slip modifying material.

The coated film may be applied to a support material which imparts stiffness or other quality to the substrate. Suitable supports include paper and paper board, cardboard or heavy sheet material, such as heavy plastic sheet, such as another polymer film or laminate, a metal foil such as aluminum foil, cellulosic webs, spunbonded polyolefin fiber. An adhesive suitable for laminating the film to the support can be a hot melt or room temperature sealable adhesive or water based adhesive.

A primer enhances binding of the coating of this invention to the uncoated film. Typical primers are polymers with good adhesion to the uncoated films such as polyethyleneimine and epoxy resins.

Typically, prior to coating the film with the final formulated composition of this invention, the film surface is treated to create a high energy surface environment sufficient for the adhesion of a primer or other coating such as by flame or corona treatment or other method which can oxidize the film surfaces. Corona treatment is accomplished by exposing the film surface to a high voltage corona discharge while passing the film between spaced electrodes. After electronic treatment of the film surface, the coating can be applied.

The coating can be applied to the substrate as an aqueous emulsion in-line after the machine direction orientation but before the transverse direction orientation. This procedure is described in U.S. Pat. No. 5,451,460. The uniaxially drawn film may be subjected to surface treatment prior to coating.

Alternatively, the coating can be applied off-line, by any conventional method. For example, the film can be coated by roller coating, spray coating, slot coating or immersion coating. Gravure roll coating or reverse direct gravure coating are acceptable methods. The excess coating solution can be removed by squeeze rolls or doctor knives.

Regardless of these methods, the amount should be such that upon drying a smooth, evenly distributed layer is obtained. A typical coating weight ranges from about 0.1 to about 10 g/m$^2$.

In one embodiment of the invention, the coating can be applied by coextrusion.

The substrate can be of any desired thickness, although thicknesses will typically range from about 20 to about 100 microns for high speed equipment.

The toner can be applied to the coated film using any electrostatic printer adapted or designed to use liquid toner such as the Indigo brand "Omnius" or "E-Print Model 1000" printers.

EXAMPLES OF THE INVENTION

Film samples were coated with four coating compositions prepared as described in the following examples.

Example 1

A coating composition is prepared by combining 1146 g of ethylene acrylic acid copolymer emulsion (MICHEM 4983 sold by Michelman), 57.3 g Carnauba wax (M-215 sold by Michelman), 1.15 g talc and 0.85 g fumed silica (SYLOID 42 sold by the Davison division of WR Grace). All the components are added to an aqueous solution. Water is added to bring the final coating composition to a solids content of 5%.

Example 2

A coating composition is prepared by combining 1130 g of ethylene-acrylic acid copolymer (sold as MICHEM 4983), 56.5 g Carnauba wax (sold as M-215), 1.13 g talc, 0.85 g fumed silica (SYLOID 42) and 4.24 g sodium hydroxide. Water is added to bring the final coating composition to a solids content of 5%.

Example 3

A coating composition prepared in accordance with Example 3 of application Ser. No. 08/582,819 is prepared by combining 19.9% ethylene-acrylic acid copolymer, 10.3% acrylic polymer, 32.4% clay, 25.8% talc, 6.4% titanium dioxide and 5.2% of commercial antistatic, suspension aid and defoamer additives in aqueous solution. This mixture is prepared to a solids concentration of about 46 to 48%.

Comparison Example

An acrylic polymer coating is prepared from 962 g acrylic-methacrylic acid copolymer (sold as 90XWO67 by Valspar), 3.17g sodium hydroxide, 18.52 g fumed silica (SYLOID 42), 52.9 g wax (M-215) and 0.53 g talc. Water is added to bring the final coating-composition to a solids content of 5%.

Evaluation of the Coatings

Each of the coatings prepared as described in the above examples are applied to one surface of a coextruded, three layer biaxially oriented polypropylene film having a total thickness of 25.4 to 31.75 microns.

The coatings are applied utilizing standard gravure coating apparatus and techniques. Prior to coating, the film is subjected to corona treatment and a polyethyleneimine primer is applied to the treated surface. The total weight of the coating of each example, on the oriented, treated, primed surface following drying, is from about 0.1 to about 4 g/m².

The coated films are tested using SW type Electroink type liquid toner on an Indigo "Omnius" electrostatic printer. The ink transfer blanket is maintained at a temperature of about 120° C. The printed films are evaluated by visually observing the quality of the print. Ink transfer is evaluated by visually examining how well the ink transfers from the blanket to the film, e.g. for completeness of the ink coating, beading and streaking. The performance in each test is given a rating of good (complete ink transfer), fair (almost complete ink transfer), medium (incomplete ink transfer), low (almost no ink transfer) and bad (no ink transfer, with all ink staying on the printer blanket).

Ink adhesion is evaluated off-line by the T-peel test in which Scotch 610 tape is applied to the printed film by laying the tape onto the film and then rubbing it down firmly (but leaving one edge free). Then the free edge of the tape is manually grasped and quickly peeled off of the film. This is done first after immediately applying the ink and then after aging the ink for 24 hours. The tape is examined for any ink residue and the film is examined for areas of missing ink. The performance in each test is given a rating of good (no ink is removed by the tape), fair (almost no ink is removed by the tape), medium (some ink is removed by the tape), low (almost all ink is removed) and bad (all ink is removed).

| Example | Ink Transfer | Initial Ink Adhesion | Ink Adhesion after 24 hours |
| --- | --- | --- | --- |
| 1 | good | good | good |
| 2 | good | good | good |
| 3 | good | fair | good |
| Comparison Example | bad | N/A | N/A |

It is apparent from the performance of the coatings of examples 1, 2 and 3 that the ethylene-acrylic acid copolymer based coating formulation effectively provides a liquid toner receiving element for electrostatic imaging or printing. In example 3 after aging for twenty four hours the ink is not removed by the tape. In contrast, the all acrylic based coating formulation is ineffective, ink does not transfer from the blanket to the film, all the ink remains on the printer blanket. Since no ink transfers to the film, ink adhesion testing is inapplicable.

What is claimed is:

1. An electrostatically printed thermoplastic film comprising a biaxially oriented polypropylene substrate having on at least one side a coating of an aqueous emulsion having a solids content ranging from 1 to about 60 weight percent based on the entire weight of the coating composition for receiving toner derived from a liquid toner composition, the coating being applied to a final coating weight of about 0.1 to about 10 g/m², the coating comprising (a) a copolymer derived from a carboxylic acid containing vinylic unsaturation; and (b) an antiblock/slip agent the coated substrate having the toner composition electrostatically applied thereto.

2. The electrostatically printed thermoplastic film of claim 1 in which the copolymer derived from a carboxylic acid containing vinylic unsaturation is a copolymer of ethylene and acrylic acid or methacrylic acid.

3. The electrostatically printed thermoplastic film of claim 2 in which carboxylate groups of the acrylic or methacrylic acid are neutralized with a metal selected from the group consisting of sodium, potassium, calcium or zinc.

4. The electrostatically printed thermoplastic film of claim 2 in which the coating further comprises an acrylic polymer.

5. The electrostatically printed thermoplastic film of claim 1 in which the coating further comprises silica.

6. The electrostatically printed thermoplastic film of claim 1 in which the amount of silica ranges from about 0.1 to about 80 wt. % based on the entire weight of the coating.

7. The electrostatically printed thermoplastic film of claim 1 in which the coating further comprises a wax.

8. The electrostatically printed thermoplastic film of claim 7 in which the wax is selected from the group consisting of carnauba wax, microcrystalline wax, polyethylene wax and blends thereof.

9. The electrostatically printed thermoplastic film of claim 7 in which the amount of wax ranges from about 1 to about 20 wt. % based on the entire weight of the coating.

10. The electrostatically printed thermoplastic film of claim 1 in which at least one layer of the substrate comprises polypropylene and at least one outer layer comprises a polymer having better sealability than polypropylene.

11. The electrostatically printed thermoplastic film of claim 1 in which the substrate comprises at least three layers comprising a core layer and two outer layers, the core layer comprising polypropylene and at least one of the outer layers selected from the group consisting of a copolymer or terpolymer of propylene and ethylene and/or butene-1 or ethylene homopolymer.

12. The electrostatically printed thermoplastic film of claim 1 in which the substrate comprises at least five layers comprising a central core layer, two intermediate layers contiguous to the central core layer and two outer layers, the polymer of the central core layer comprises polypropylene, the polymer of at least one of the intermediate layers comprises polypropylene and the polymer of at least one of the two outer layers comprise a copolymer or terpolymer of propylene and ethylene and/or butene-1 or ethylene homopolymer.

13. The electrostatically printed thermoplastic film of claim 1 which further comprises at least two particulates selected from the group consisting of wax, silica, clay, talc and titanium dioxide.

* * * * *